(12) United States Patent
Pollington et al.

(10) Patent No.: US 7,735,437 B2
(45) Date of Patent: Jun. 15, 2010

(54) EXHAUST GAS COOLING APPARATUS

(76) Inventors: Gary Pollington, P.O. Box 2633, Havre, MT (US) 59501; Ed Goodian, 30959 Rd. 110 South, Box Elder, MT (US) 59521; Arron Goodian, 34115 Rd. 80 South, Kremlin, MT (US) 59532; Keith Richardson, P.O. Box 387, Havre, MT (US) 59501

( * ) Notice: Subject to any disclaimer, the term of this patent is extended or adjusted under 35 U.S.C. 154(b) by 187 days.

(21) Appl. No.: 12/182,829

(22) Filed: Jul. 30, 2008

(65) Prior Publication Data

US 2010/0024408 A1 Feb. 4, 2010

(51) Int. Cl.
*A01C 7/00* (2006.01)
*A01C 9/00* (2006.01)
*A01C 15/00* (2006.01)
*B05B 1/24* (2006.01)
*B05B 9/00* (2006.01)

(52) U.S. Cl. .................. 111/174; 111/200; 239/129; 239/140; 239/172; 71/25; 71/901; 62/56

(58) Field of Classification Search ......... 239/128–132, 239/132.1, 132.3, 132.5, 140, 142, 143, 146, 239/147, 159–170, 172, 176; 71/1, 25, 54, 71/59, 901, 903; 62/56, 79, 89, 95–100, 62/118; 111/174, 200

See application file for complete search history.

(56) References Cited

U.S. PATENT DOCUMENTS

| 1,717,911 | A | 6/1929 | Brewer |
| 1,725,190 | A | 8/1929 | Hicks |
| 2,800,764 | A | 7/1957 | Johnson |
| 2,943,419 | A | 7/1960 | Harris, Jr. |
| 3,888,652 | A | 6/1975 | Yie et al. |
| 4,247,321 | A | 1/1981 | Persinger |
| 4,297,123 | A | 10/1981 | Wyse et al. |
| 4,632,044 | A | 12/1986 | Allen |
| 2006/0010947 | A1 | 1/2006 | Lewis |

*Primary Examiner*—Christopher J. Novosad
(74) *Attorney, Agent, or Firm*—Antoinette M. Tease

(57) ABSTRACT

An exhaust gas cooling apparatus comprising a cooling chamber, primary distribution tube, cooling fan, and transfer fan; the cooling chamber is mounted on the side of a tractor; the cooling fan is installed in the rear end of the cooling chamber; the cooling chamber comprises a plurality of longitudinal apertures through which ambient air travels and a plurality of baffle chambers through which exhaust gas travels; the exhaust gas never mixes with the ambient air in the cooling chamber; the exhaust gas travels through the exit port of the cooling chamber into a primary distribution tube that carries the exhaust gas to a transfer fan; the transfer fan blows the exhaust gas into a plurality of secondary distribution tubes that transport the exhaust gas to a plurality of manifolds; and the exhaust gas travels from the manifolds through a plurality of tertiary distribution tubes and into the ground.

7 Claims, 15 Drawing Sheets

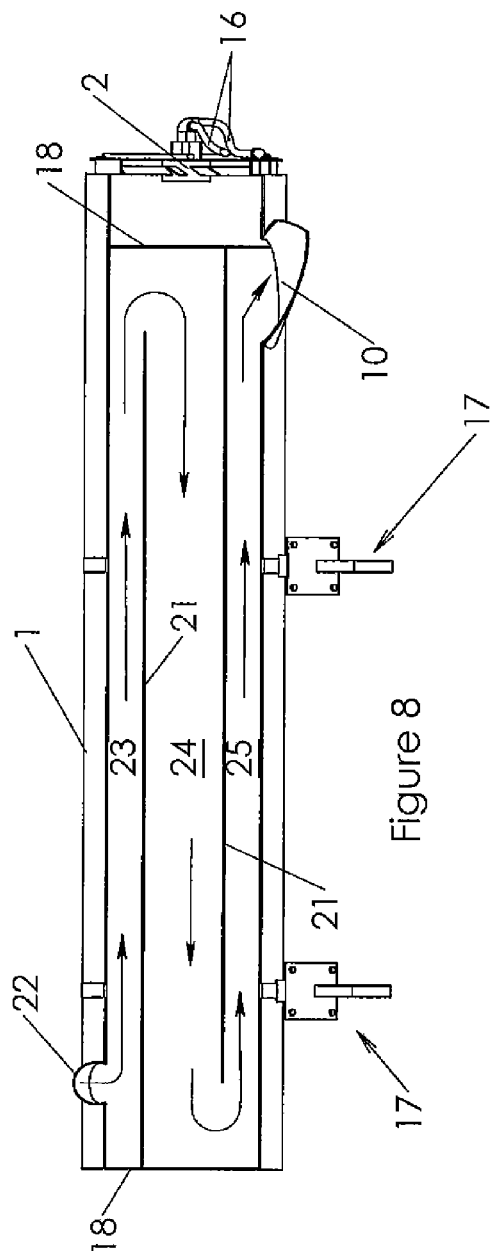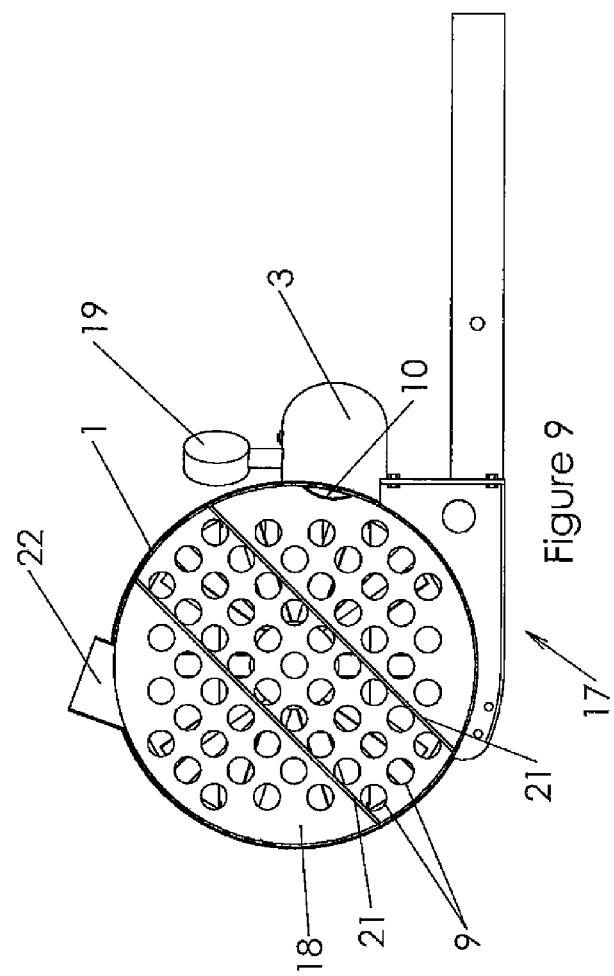

EXHAUST GAS COOLING APPARATUS

BACKGROUND OF THE INVENTION

1. Field of the Invention

The present invention relates generally to the field of agricultural equipment, and more specifically, to an apparatus designed to cool the exhaust gas from an agricultural tractor prior to injection of the exhaust gas into the ground.

2. Description of the Related Art

It is well known that exhaust gas from vehicles contributes to global warming and is generally considered bad for the environment. One of the components of exhaust gas, including gas from agricultural tractors, is nitrogen. It is also a fact in today's current economic environment that a significant expense for many farmers is fertilizer. Farmers use nitrogen-bearing fertilizer to feed beneficial microorganisms in the soil, which in turn yields more productive crops. Both problems would be solved if there were a way to capture the exhaust gas from an agricultural tractor and inject it into the ground, thereby preventing the exhaust gas from entering the atmosphere (this is called "carbon sequestration") and saving money for farmers by reducing or eliminating fertilizer expense at the same time.

One prior art apparatus (shown in FIG. 18) attempts to solve this problem by capturing the exhaust gas from an agricultural tractor, passing the gas through a grid of aluminum tubing, and then feeding the exhaust into the air seeder fan on the front end of the seeder cart. The air seeder fan then blows the exhaust gas into the seed tank. This particular apparatus is deficient because it intermingles the exhaust gas with the seed in the seed tank, which causes the seed and the tank to become dirty and wet. What would be preferable would be a design that segregated the seed from the exhaust gas until the seed and gas hit the ground.

There are a number of other prior art apparatuses that involve the capture and use of exhaust gas to stimulate crop growth, but none of these devices cools the exhaust gas in the same manner as the present invention. Cooling the exhaust gas is important to avoid melt-down of hoses and other parts. What distinguishes the present invention from other cooling methods is the design of the cooling chamber and the fact that ambient air is used to cool the exhaust gas but is never actually mixed with the exhaust gas.

Examples of prior art apparatuses that involve the capture and use of exhaust gas from an agricultural vehicle and the injection of that gas, in one form or another, into the ground for purposes of crop stimulation are U.S. Pat. No. 2,943,419 (Harris, Jr., 1960); U.S. Pat. No. 1,725,190 (Hicks, 1929); and U.S. Pat. No. 4,632,044 (Allen, 1986). Other prior art apparatuses deal generally with the utilization of exhaust gases (not necessarily from an agricultural vehicle) or explosive forces of the exhaust from a motor for purposes of soil fertilization and/or stimulation. Examples include U.S. Pat. No. 2,800,764 (Johnson, 1957); U.S. Pat. No. 1,717,911 (Brewer, 1929); U.S. Pat. No. 3,888,652 (Yie et al., 1975); U.S. Pat. No. 4,247,321 (Persinger, 1981); U.S. Pat. No. 4,297,123 (Wyse et al., 1981); and U.S. Patent Application Pub. No. 2006/0010947 (Lewis).

What is needed is an apparatus that captures the exhaust gas from an agricultural tractor, cools it without mixing the exhaust gas with anything other substance (e.g., ambient air or seed), and injects it into the ground. Accordingly, it is an object of the present invention to provide an apparatus that performs this functionality via a cooling chamber that can be installed on any agricultural tractor and that can be used with either an air seeder or a cultivator. It is a further object of the present invention to allow the tractor operator to control both the temperature and the pressure of the exhaust gas to prevent hose melt-down and/or backflow of exhaust gas to the engine. Segregation of the exhaust gas from other substances allows the operator to maintain better control over the temperature and pressure of the exhaust gas.

BRIEF SUMMARY OF THE INVENTION

The present invention is an exhaust gas cooling apparatus comprising: a cooling chamber; a primary distribution tube; a cooling fan; and a transfer fan; wherein the cooling chamber is mounted on the side of a tractor with an engine; wherein the cooling chamber has a front end and a rear end; wherein the cooling fan is installed in the rear end of the cooling chamber; wherein the cooling chamber comprises a plurality of longitudinal apertures through which ambient air travels; wherein the cooling chamber comprises a plurality of baffle chambers through which exhaust gas from the tractor engine travels; wherein the exhaust gas never mixes with the ambient air in the cooling chamber; wherein the cooling chamber comprises an exit port; wherein the exhaust gas travels through the exit port of the cooling chamber into a primary distribution tube; wherein the primary distribution tube carries the exhaust gas to a transfer fan; wherein the transfer fan blows the exhaust gas into a plurality of secondary distribution tubes; wherein the secondary distribution tubes transport the exhaust gas to a plurality of manifolds; and wherein the exhaust gas travels from the manifolds through a plurality of tertiary distribution tubes and into the ground.

In a first embodiment, the tractor is attached to an air seeder comprising an air seeder cart; the primary distribution tube carries the exhaust gas around the air seeder cart and to the transfer fan; the transfer fan is located behind the air seeder cart; the air seeder comprises a distribution system; the air seeder distribution system is located behind the transfer fan; the distribution system of the air seeder comprises a plurality of secondary distribution tubes, a first set of manifolds, a plurality of tertiary distribution tubes, and a plurality of quaternary distribution tubes; the secondary distribution tubes of the air seeder are utilized to transport the exhaust gas from the transfer fan to the first set of manifolds; the tertiary distribution tubes are utilized to transport the exhaust gas from the first set of manifolds to the ground; the quaternary distribution tubes are used to deliver seed from a second set of manifolds to the ground; the exhaust gas and the seed never come into contact with one another until they hit the ground; and the exhaust gas never enters the air seeder cart.

In a second embodiment, the tractor is attached to a cultivator; the primary distribution tube carries the exhaust gas to a transfer fan located behind the tractor; the cultivator comprises a distribution system; the cultivator distribution system is located behind the transfer fan; the distribution system of the cultivator comprises a plurality of secondary distribution tubes, a plurality of manifolds, and a plurality of tertiary distribution tubes; the secondary distribution tubes of the cultivator are utilized to transport the exhaust gas from the transfer fan to the manifolds; and the tertiary distribution tubes are utilized to transport the exhaust gas from the manifolds to the ground.

In a preferred embodiment, the cooling chamber comprises: a primary aluminum tube that forms an outer covering for the cooling chamber; two circular aluminum end plates; a plurality of secondary aluminum tubes that form the longitudinal apertures in the cooling chamber; and two aluminum baffles that form three baffle chambers inside the cooling chamber; wherein a plurality of evenly spaced holes is cut into each of the end plates; wherein each hole in the end plate has an inside diameter and each secondary aluminum tube has an outside diameter, and the inside diameter of each hole in the end plate corresponds to the outside diameter of each secondary aluminum tube; wherein each secondary aluminum tube comprises a first end and a second end; wherein the first end of each secondary aluminum tube is inserted into a hole in one of the end plates, the second end of each secondary aluminum tube is inserted into a hole in the other end plate, and each secondary aluminum tube is welded to the end plates on either end of the secondary aluminum tube; wherein the length of each secondary aluminum tube is shorter than the length of the primary aluminum tube by the a first amount; wherein a first aluminum baffle is welded to one of the end plates and to a plurality of secondary aluminum tubes; wherein a second aluminum baffle is welded to the other end plate and to a plurality of secondary aluminum tubes; wherein each aluminum baffle is shorter than the length of the secondary aluminum tubes by a second amount; wherein the primary aluminum tube has an inside diameter, and the width of each aluminum baffle corresponds to the inside diameter of the primary aluminum tube where each baffle rests; and wherein the primary aluminum tube comprises a front end and a rear end, and wherein one of the end plates is welded to the front end of the primary aluminum tube, and the other end plate is welded inside of the primary aluminum tube at a distance from the rear end of the primary aluminum tube roughly equal to the first amount, thereby leaving space for the cooling fan to be installed.

In a preferred embodiment, the present invention further comprises a pyrometer sensor located in proximity to the exit port of the cooling chamber; wherein the ambient air traveling through the longitudinal apertures has a temperature and the exhaust gas entering the primary distribution tube has a temperature; wherein the cooling fan controls the temperature of the ambient air traveling through the longitudinal apertures; wherein the pyrometer sensor senses the temperature of the exhaust gas as it enters the primary distribution tube; and wherein the temperature of the exhaust gas entering the primary distribution tube can be controlled by increasing or decreasing the temperature of the ambient air via the cooling fan.

In yet another preferred embodiment, the present invention further comprises a pressure gauge located in proximity to the exit port of the cooling chamber; wherein the exhaust gas entering the primary distribution tube has a pressure; wherein the pressure gauge senses the pressure of the exhaust gas as it enters the primary distribution tube; wherein the transfer fan has a speed; and wherein the pressure of the exhaust gas can be controlled by increasing or decreasing the speed of the transfer fan.

Both the cooling fan and the transfer fan are preferably controlled by variable speed hydraulic motors.

BRIEF DESCRIPTION OF THE DRAWINGS

FIG. 8 is a longitudinal section view of the cooling chamber of the present invention.

FIG. 9 is a lateral section view of the cooling chamber of the present invention.

REFERENCE NUMBERS

Figure 1:
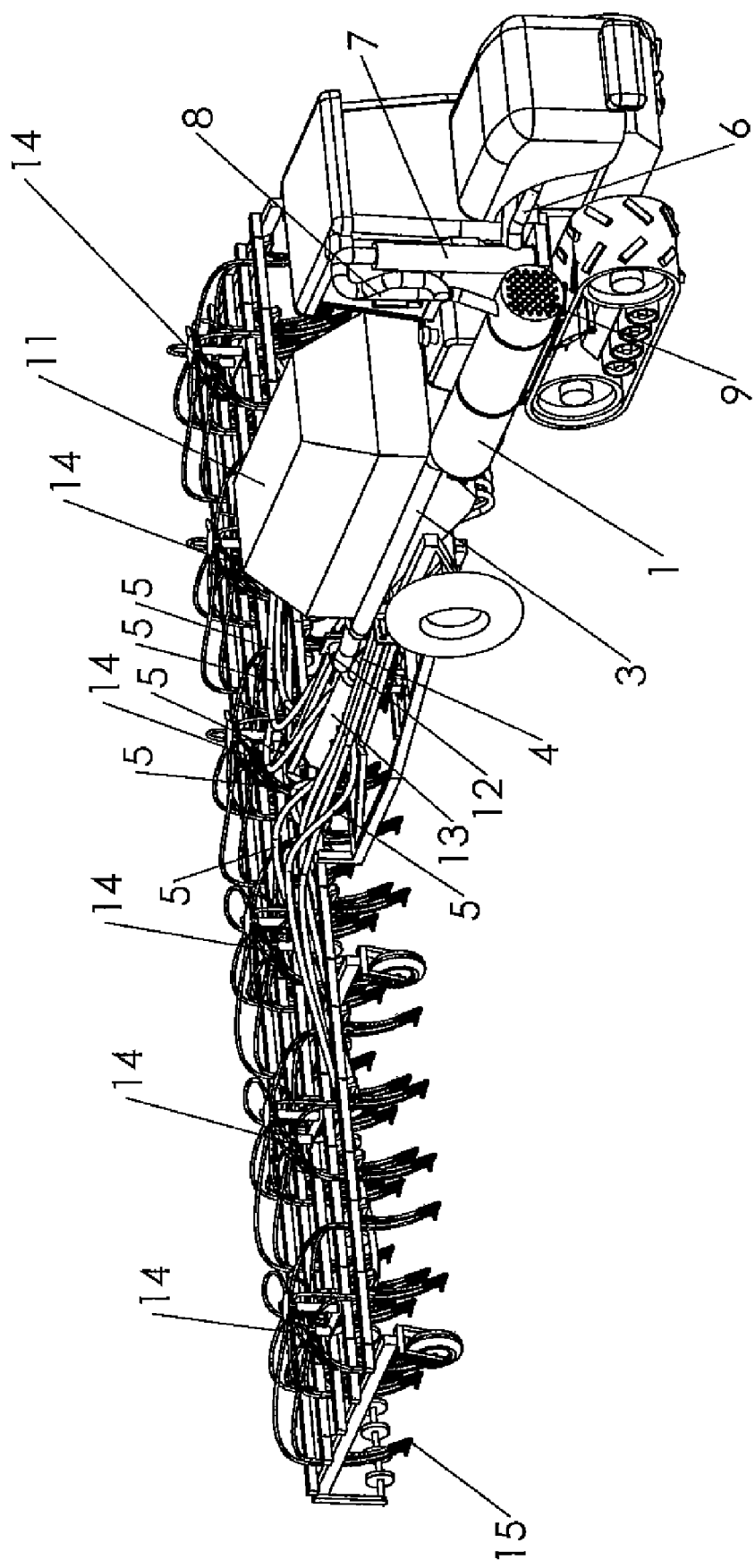
FIG. 1 is a perspective view of the present invention installed on a tractor with an air seeder attached to it.

1 Cooling chamber
2 Cooling fan
3 Primary distribution tube (for exhaust gas)
4 Transfer fan
5 Secondary distribution tube (for exhaust gas)
6 Exhaust pipe
7 Muffler
8 Exhaust diverter
9 Longitudinal aperture
10 Exit port
11 Air seeder cart
12 Distribution box
13 Distribution tank
14 Manifold (exhaust gas)
15 Shank
16 Hydraulic line
17 Bracket system
18 End plate
19 Pressure gauge
20 Pyrometer sensor
21 Baffle
22 Inlet
23 First baffle chamber
24 Second baffle chamber
25 Third baffle chamber
26 Hydraulic motor
27 Manifold (seed)
28 Lateral bracket (extending from cooling chamber)
29 Lateral bracket (extending from tractor)
30 Support member
31 Lateral bracket (extending from tractor)
32 Tooth
33 Tertiary distribution tube (for exhaust gas)
34 Quaternary distribution tube (for seed)

DETAILED DESCRIPTION OF INVENTION

FIG. 1 is a perspective view of the present invention installed on a tractor with an air seeder attached to it. The present invention comprises a cooling chamber 1, a cooling fan 2 (not shown), a primary distribution tube 3, a transfer fan 4, and a plurality of secondary distribution tubes 5. In this figure, the present invention is shown in connection with an air seeder, but the present invention may also be used with a cultivator (see FIG. 16). The cooling chamber 1 is mounted to the side of the tractor with a bracket system. The bracket system is shown in greater detail in FIGS. 13 and 14, but the present invention is not limited to any particular method of attaching the cooling chamber 1 to the tractor.

Exhaust gas leaves the tractor engine via the engine pipe 6, passes through the muffler 7, and then enters the gas diverter 8. The gas diverter 8 allows the operator to determine whether to send the exhaust gas through the cooling chamber 1 or vent it into the atmosphere. The operator might choose to vent the exhaust gas into the atmosphere during cold engine start-up, maintenance or traveling between jobs. Once in the cooling chamber 1, the exhaust gas passes through a series of baffle chambers (see FIGS. 8 and 9), where the exhaust gas is cooled by ambient air passing through longitudinal apertures in the cooling chamber 1. The cooling fan 2 (not shown) controls the speed at which the ambient air is pulled through the longitudinal apertures. If the air is pulled through more quickly, the temperature of the exhaust gas will be reduced more quickly. Conversely, if the cooling fan is turned down, the temperature of the exhaust gas will decrease more slowly.

The exhaust gas exits the cooling chamber 1 via an exit port 10 (not shown) and enters the primary distribution tube 3, which carries the cooled exhaust gas around the air seeder cart 11. From there, the exhaust gas enters a distribution box 12, where the transfer fan 4 blows it into a distribution tank 13. From the distribution tank, the exhaust gas is blown (by the transfer fan) out through the secondary distribution tubes 5 and down through the manifolds 14 on the air seeder distribution/injection system and into the ground. The seed is also transported through the air seeder distribution/injection system and into the ground, but the seed never mixes with the exhaust gas until both hit the ground after exiting the shank 15. (The seeds are blown out the distribution/injection system by the air seeder fan, which is not utilized by the present invention.)

Figure 2:
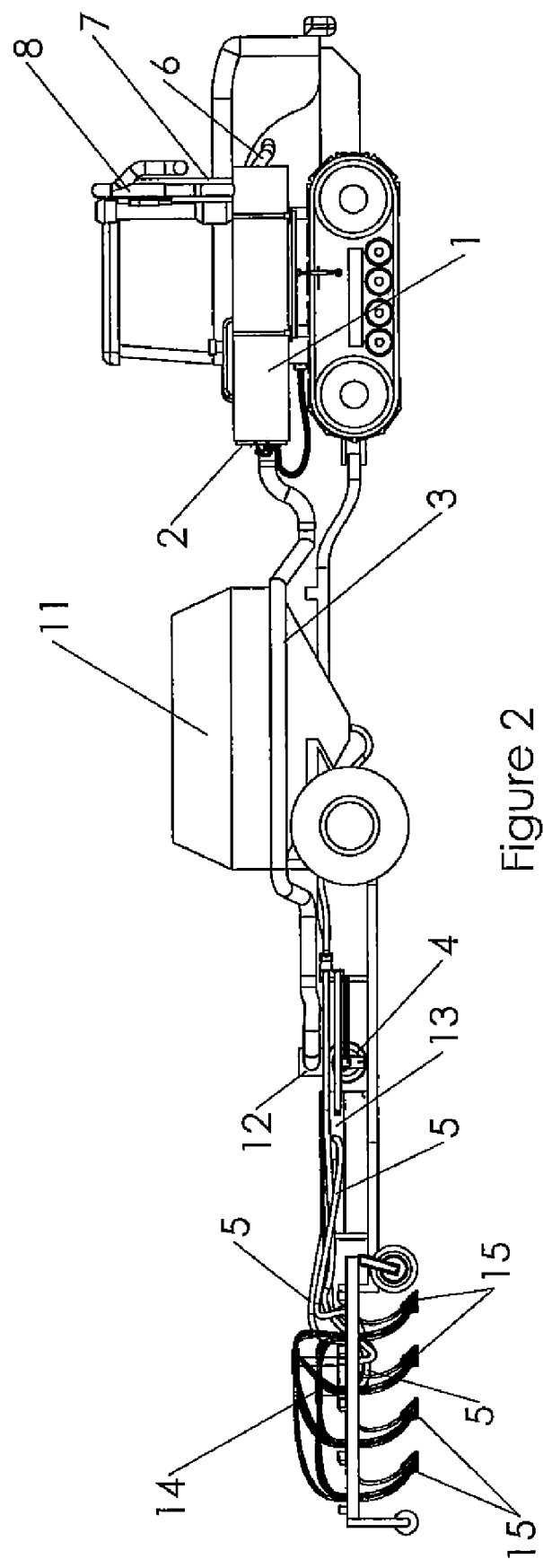
FIG. 2 is a side view of the present invention installed on a tractor with an air seeder attached to it.

FIG. 2 is a side view of the present invention installed on a tractor with an air seeder attached to it. This figure shows the housing for the cooling fan 2 on the rear end of the cooling chamber 1. The cooling chamber 1 may be sized differently for varying engine horsepower applications, but the basic design remains the same. The embodiment described in the following two paragraphs works well with engines in the 350-400 horsepower range.

In this embodiment, the cooling chamber is comprised of an aluminum tube that is ten feet long and 28 inches in diameter. The tube is constructed of 0.10-inch aluminum plate rolled to form the tube. End plates are welded into the ends of the tube. The two end plates are identical and are cut from ¼-inch aluminum plate. The end plates are circular in shape with an outside diameter equal to the inside diameter of the tube. In each end plate 60 evenly spaced two-inch diameter holes are cut. Aluminum tubes cut to a length of nine feet nine inches and having an outside diameter of two inches are inserted into the corresponding holes in each end plate and welded flush to the end plates. Two aluminum baffles are placed inside the cooling chamber on the two-inch tubes in such a manner as to cause the exhaust gas to traverse the length of the cooling chamber three times before exiting through the exit port 10 (see FIGS. 8 and 9).

The baffles are constructed of 0.10-inch aluminum plate cut to a length of 8 feet 9 inches 9 (one foot shorter than the two-inch tubes) and a width corresponding to the inside dimension of the 28-inch tube where each baffle rests. Each baffle is welded to one row of the two-inch tubes and to an end plate (one baffle is welded to one end plate, and the other baffle is welded to the other end plate). The welded structure—end plates, two-inch aluminum tubes, and baffles—is then slid into the 28-inch tube and welded in place. It will be flush with one end (the front end of the cooling chamber) and three inches short of the other end. This three-inch extension will aid in the mounting of the cooling fan 2.

Although the preferred embodiment described above and shown in the figures utilizes 60 two-inch aluminum tubes to create the longitudinal apertures 9 in the cooling chamber 1, the present invention is not limited to any particular diameter for the aluminum tubes that form the longitudinal apertures 9 (as long as a plurality of such tubes fits inside the cooling chamber 1), nor is it limited to any particular number of longitudinal apertures 9 (as long as an adequate number of longitudinal apertures is created in the cooling chamber to allow for sufficient cooling of the exhaust gas). The cooling chamber 1 is shown in greater detail in FIGS. 9-9.

Figure 3:
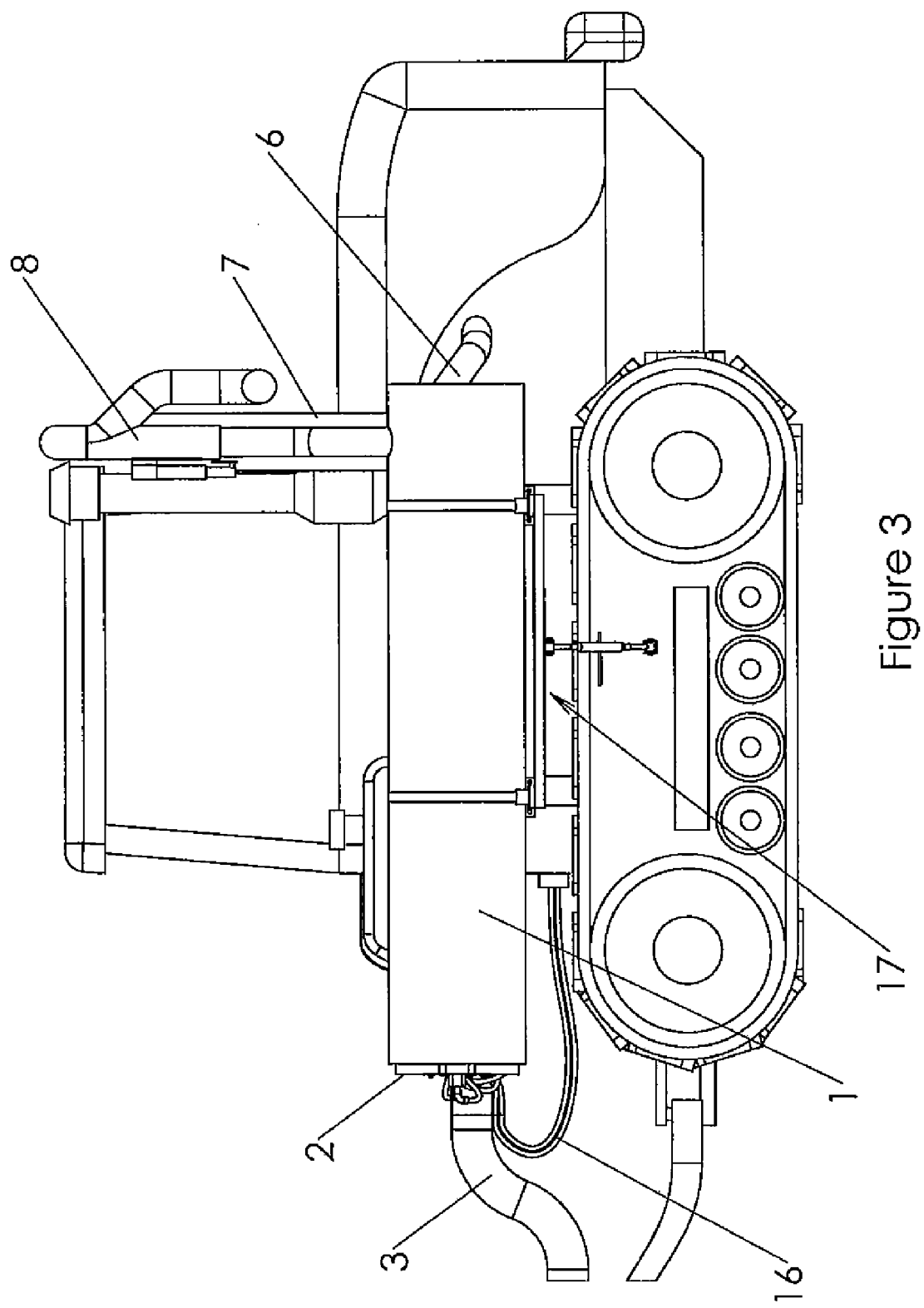
FIG. 3 is a side view of the present invention installed on a tractor.

FIG. 3 is a side view of the present invention installed on a tractor. This view shows in greater detail the hydraulic lines 16 that control the cooling fan (the controls are located in the cab of the tractor) and the bracket system 17 that is used to mount the cooling chamber 1 on the tractor.

Figure 4:
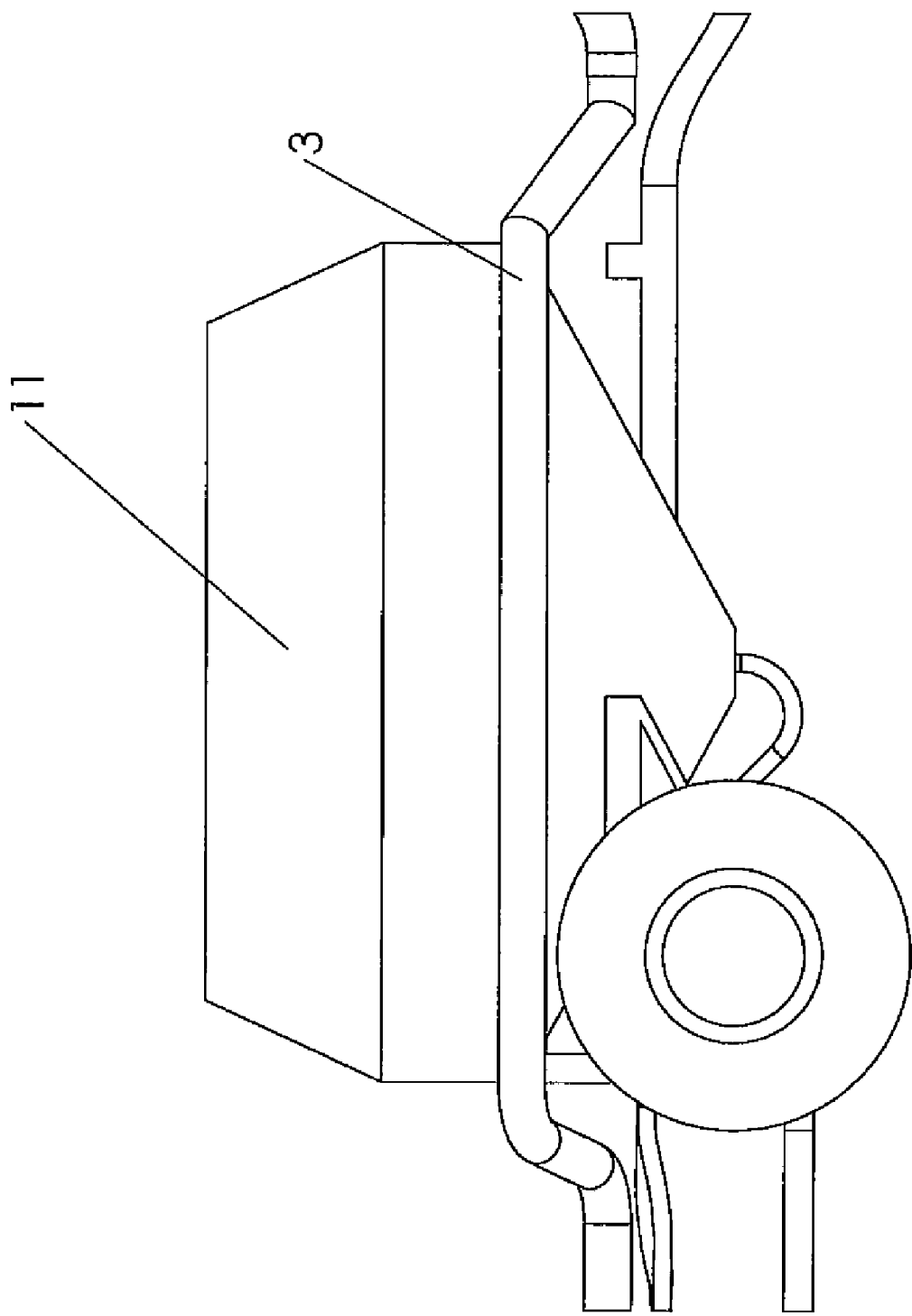
FIG. 4 is a side view of an air seeder showing the primary distribution tube of the present invention.

FIG. 4 is a side view of an air seeder showing the primary distribution tube of the present invention. The purpose of the primary distribution tube is to transport the exhaust gas from the exit port 10 of the cooling fan 2 (see FIG. 7) to the transfer fan 4 (see FIG. 5).

Figure 5:
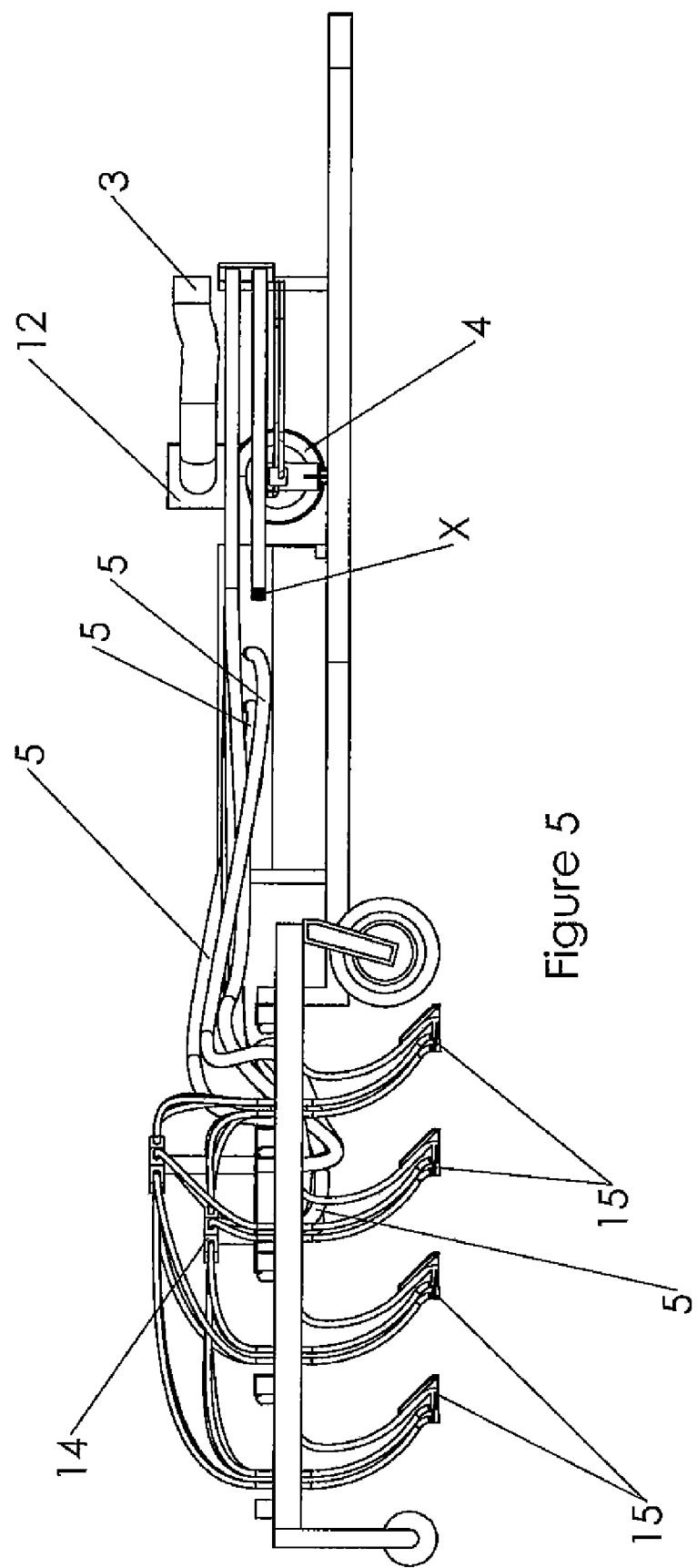
FIG. 5 is a side view of the distribution/injection system of the present invention.

FIG. 5 is a side view of the distribution/injection system of the present invention. As shown in this figure, the primary distribution tube 3 delivers the exhaust gas to a distribution box 12, from which the transfer fan 4 blows the exhaust gas into a distribution tank 13. The distribution tank 13 is connected to a plurality of secondary distribution hoses 5 (in this case, six), which transport the exhaust gas to the manifolds 14 of the air seeder distribution system and out the shanks 15 onto the ground. The exhaust gas travels through the secondary distribution hoses 5 that would normally be used to transport dry fertilizer. FIG. 5 shows where the secondary distribution hoses 5 are disconnected from their normal attachment point (see "X") and connected to the distribution tank 13 for purposes of utilizing the present invention. In this manner, the present invention can be utilized in connection with an existing air seeder system.

Figure 6:
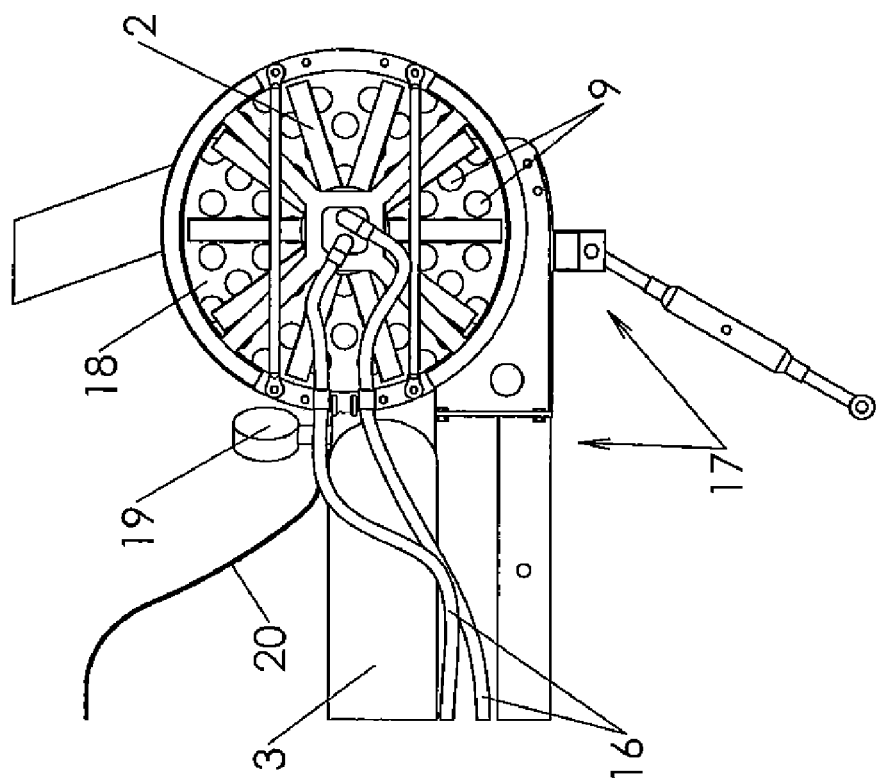
FIG. 6 is a front view of the cooling chamber of the present invention.

FIG. 6 is a front view of the cooling chamber of the present invention. This figure shows the longitudinal apertures 9 created by the two-inch aluminum tubes that are welded to the end plates 18 of the cooling chamber 1. It also shows the pressure gauge 19 and pyrometer sensor 20, which are used to gauge the pressure and temperature, respectively, of the exhaust gas as it exist the cooling chamber 1. In this manner, the operator can control pressure to avoid the backflow of exhaust gas into the engine (a slight vacuum at the pressure gauge is preferred) and temperature to avoid melt-down of hoses and other parts. In an alternate embodiment, pressure and temperature are controlled automatically by a computer located in the cab of the tractor.

Figure 7:
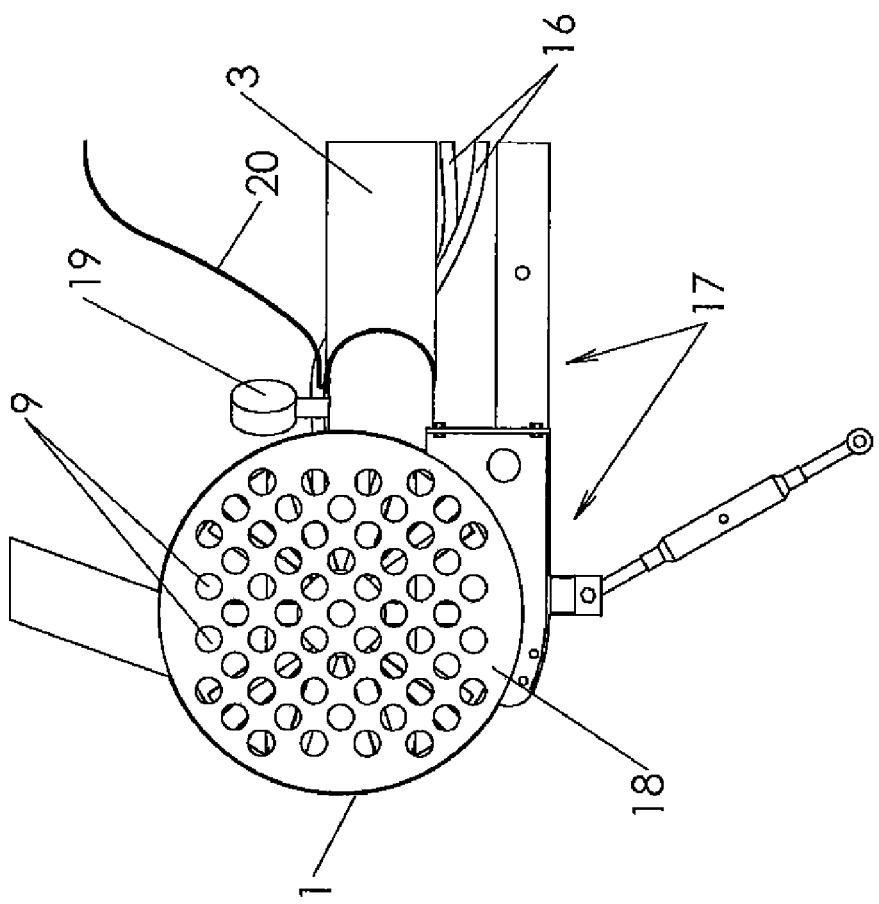
FIG. 7 is a rear view of the cooling chamber of the present invention.

FIG. 7 is a rear view of the cooling chamber of the present invention. This view clearly shows the cooling fan 2, which is housed in the three-inch gap between the rear end plate 18 of the cooling chamber 1 and the end of the 10-foot tube that forms the outside of the cooling chamber. Although the cooling fan 2 is shown with a hydraulic line 16, both the cooling fan 2 and the transfer fan 4 of the present invention may be powered by a variable speed electric or hydraulic motor. The variable speed of the cooling fan 2 allows the operator or automatic sensing device to maintain a relatively constant exhaust gas temperature at different power settings and varying ambient air temperatures.

FIG. 8 is a longitudinal section view of the cooling chamber of the present invention. (The two-inch aluminum tubes that form the apertures 9 have been omitted for clarity.) This figure shows the baffles 21 (described above) that are welded to the end plates 18 of the cooling chamber 1. It also shows the exit port 10 through which the exhaust gas exits the cooling chamber and enters the primary distribution tube 3 (not shown). The exhaust gas enters the cooling chamber at an inlet 22 on the top of the cooling chamber 1. The inlet delivers the exhaust gas to the first baffle chamber 23 created by the placement of the baffles. The exhaust gas travels the length of the first baffle chamber 23 to the second baffle chamber 24, where it travels the length of the second baffle chamber 24 and enters the third baffle chamber 25. The exhaust gas then travels the length of the third baffle chamber 25 and exits through the exit port 10. In this manner, the exhaust gas is cooled by the ambient air traveling through the longitudinal apertures 9 (not shown for clarity) created by the two-inch aluminum tubes inside of the cooling chamber. The cooling fan 2 pulls the ambient air through the longitudinal apertures 9. The arrows in FIG. 8 indicate the path of travel of the exhaust gas.

FIG. 9 is a lateral section view of the cooling chamber of the present invention. This figure shows the longitudinal apertures 9 created by the two-inch aluminum tubes inside of the cooling chamber. These tubes are exposed to the atmosphere on either end, thereby allowing ambient air to travel through them. Because the tubes are enclosed and welded to the end plates, the ambient air never mixes with the exhaust gas. This figure also shows the orientation of the baffles 18 relative to the inlet and exit port 10.

Figure 10:
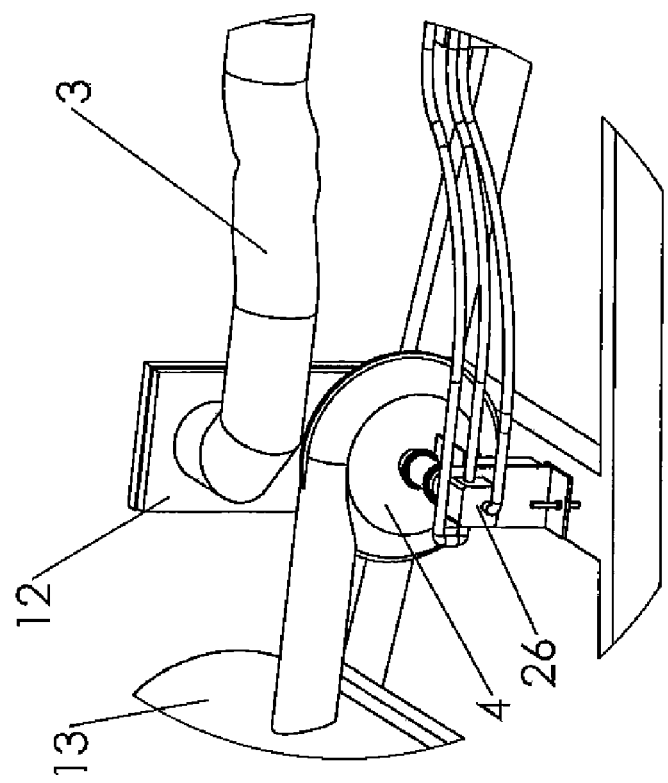
FIG. 10 is a first perspective view of the transfer fan of the present invention.

FIG. 10 is a first perspective view of the transfer fan of the present invention. The transfer fan 4 is preferably driven by a hydraulic motor 26 that can be controlled from the cab of the tractor. If the pressure reading from the pressure gauge 19 is too high, the operator can increase the power to the transfer fan 4, which will cause the transfer fan 4 to pull the exhaust gas more forcefully through the primary distribution tube 3 and push it out the secondary distribution tubes 5 (not shown). The idea is to utilize the transfer fan 4 so that the engine of the tractor is not doing all of the work in pushing the exhaust gas through the system.

Figure 11:
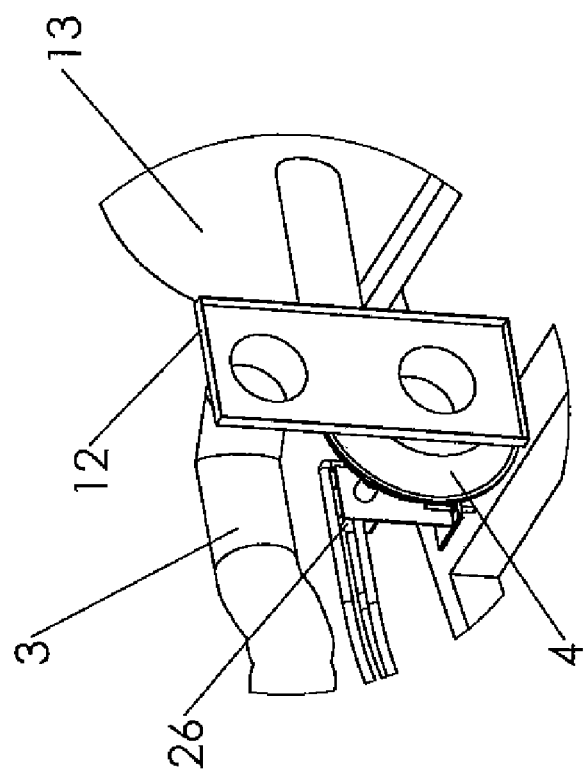
FIG. 11 is a second perspective view of the transfer fan of the present invention with one side of the distribution box removed.

FIG. 11 is a second perspective view of the transfer fan of the present invention with one side of the distribution box removed. The purpose of the distribution box 12 is to couple the primary distribution tube 3 with the transfer fan 4 so that the exhaust gas delivered by the primary distribution tube 3 will enter the transfer fan 4, where it is blown into the distribution tank 13 and out through the secondary distribution tubes. The removable cover on the distribution box 12 also allows maintenance to be performed on the transfer fan 4 if necessary.

Figure 12:
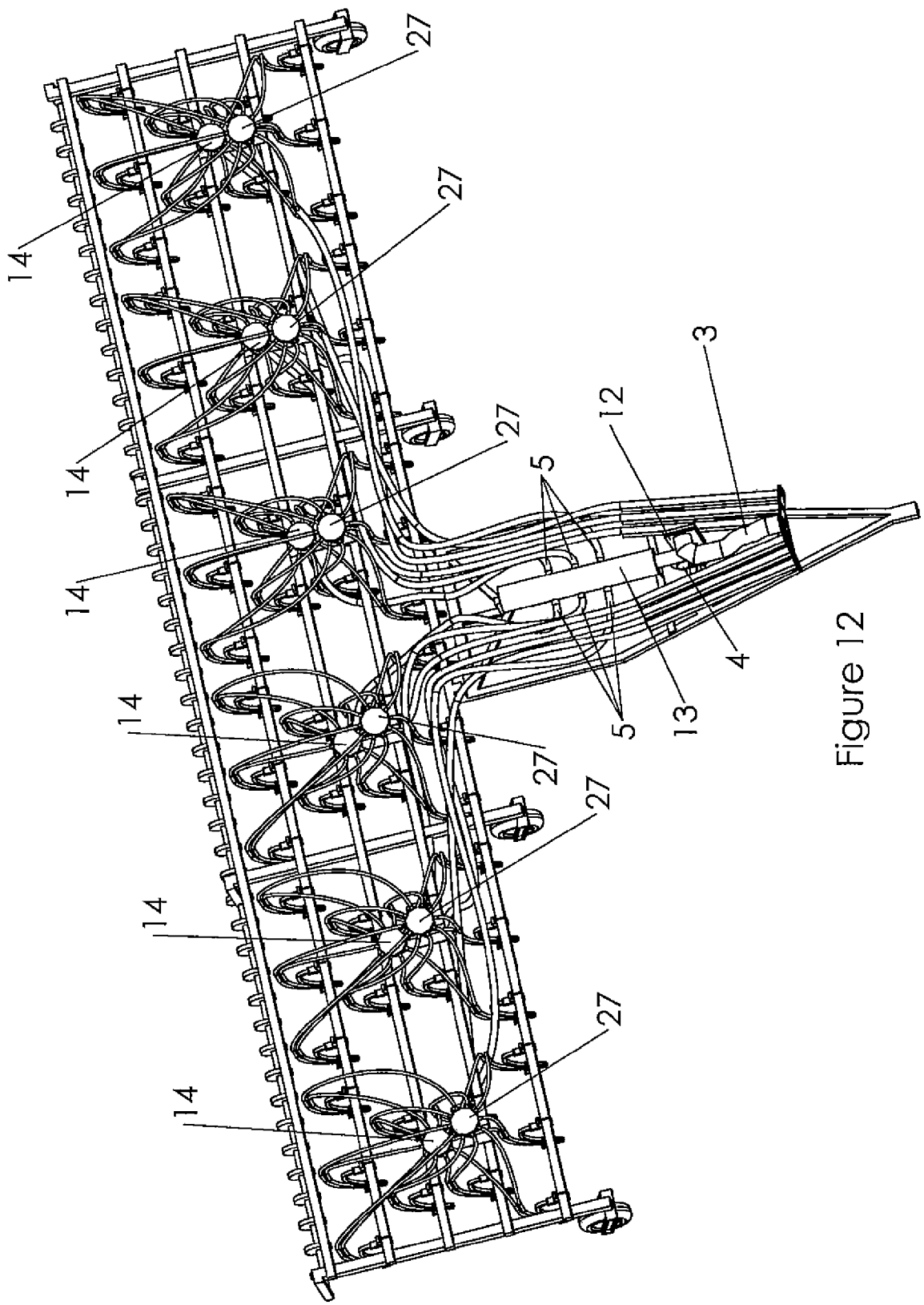
FIG. 12 is a top view of the distribution/injection system of the present invention.

FIG. 12 is a top view of the distribution/injection system of the present invention. With a few slight modifications, the present invention utilizes the existing distribution/injection system on an air seeder. (The same would be true if the present invention were used with a cultivator in lieu of an air seeder; see FIG. 16.) As explained above, the secondary distribution tubes 5 at would normally deliver dry fertilizer are disengaged from the air seeder cart and instead connected to the distribution tank 14, which allows them to be used for the purpose of delivering exhaust gas to the manifolds 14, out the shanks 15 and into the ground. Note that the number of secondary distribution tubes 5 coming out of the distribution tank 13 equals the number of manifolds 14 to which the exhaust gas is delivered. FIG. 12 also shows the manifolds 27 through which the seed is delivered. Each shank 15 is connected to one secondary distribution tube 5 from the exhaust gas manifold 14 and one secondary distribution tube from the seed manifold 27.

Figure 13:
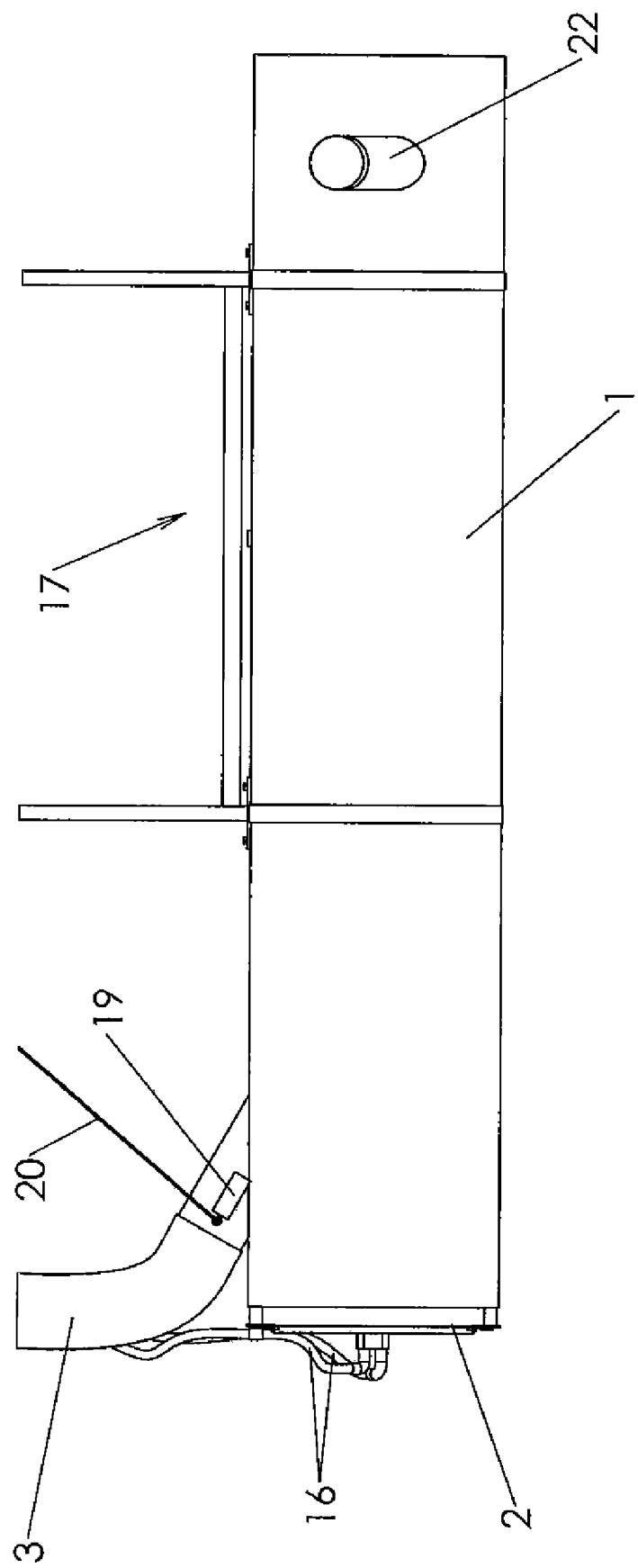
FIG. 13 is a top view of the cooling chamber of the present invention.

FIG. 13 is a top view of the cooling chamber of the present invention. This figure shows the inlet 22. It also shows the pressure gauge 19 and pyrometer sensor 20 in proximity to the exit port 10 (not shown). The housing for the cooling fan 2 is shown, although the cooling fan itself is nestled inside of the rear end of the cooling chamber 1. FIG. 7 provides a direct view of the cooling fan 2.

Figure 14:
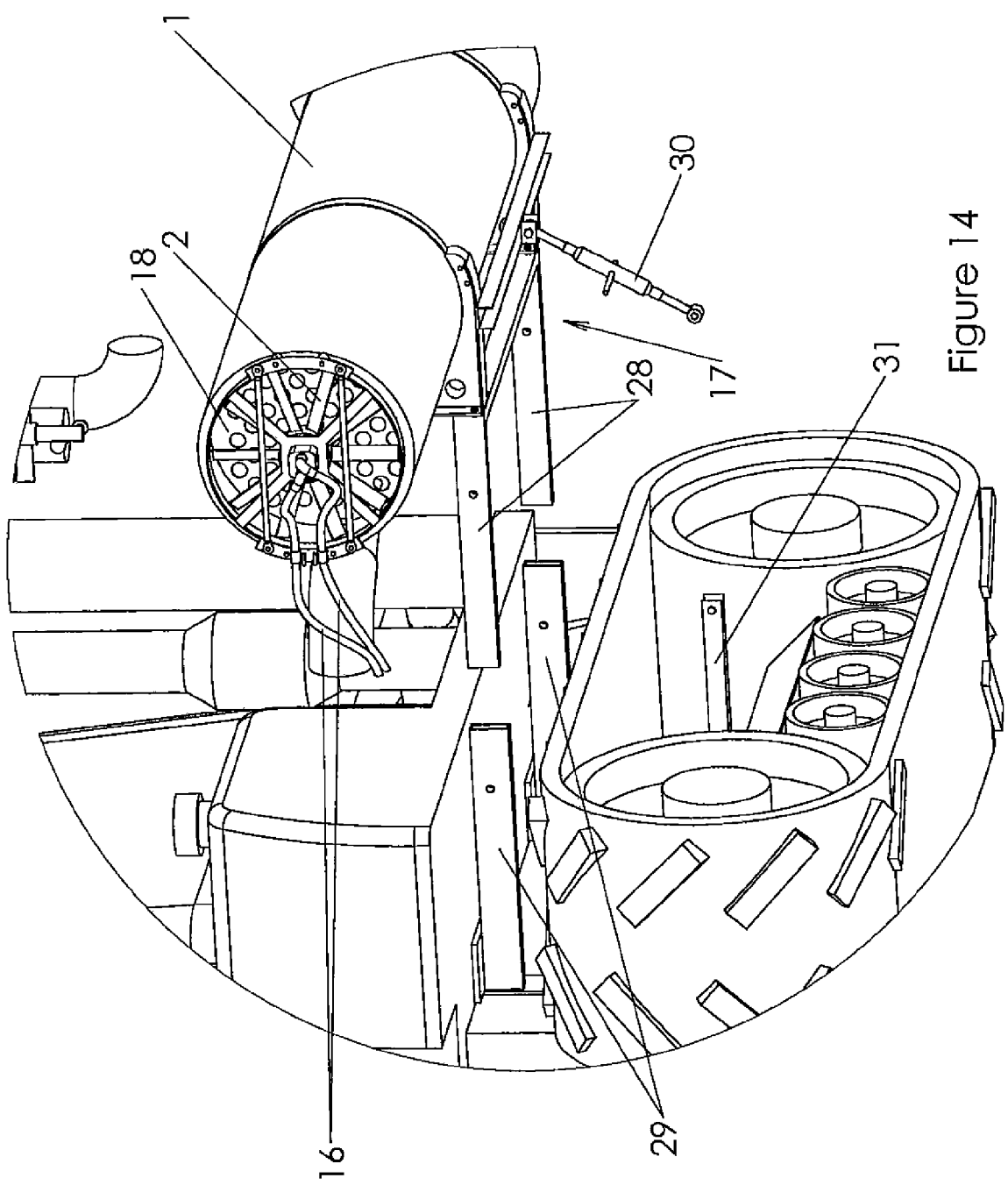
FIG. 14 is a bottom perspective view of the cooling chamber of the present invention showing the bracket system.

FIG. 14 is a bottom perspective view of the cooling chamber of the present invention showing the bracket system. This figure illustrates the case with which the cooling chamber 1 can be installed on the tractor using the bracket system shown in this figure. As noted above, the present invention is not limited to any particular bracket system; however, the bracket system shown in this figure allows the cooling chamber 1 to be installed or removed with three bolts. To install the cooling chamber, the two lateral brackets 28 extending from the cooling chamber are inserted into the two lateral brackets 29 extending from the tractor and secured with two bolts (not shown). An adjustable support member 30 extends at an angle from beneath the cooling chamber and is attached with a bolt (not shown) to yet another lateral bracket 31 extending from the tractor. To remove the cooling chamber, the three bolts are removed, and the cooling chamber with its attached bracket system 17 attached is slid away from the tractor.

Figure 15:
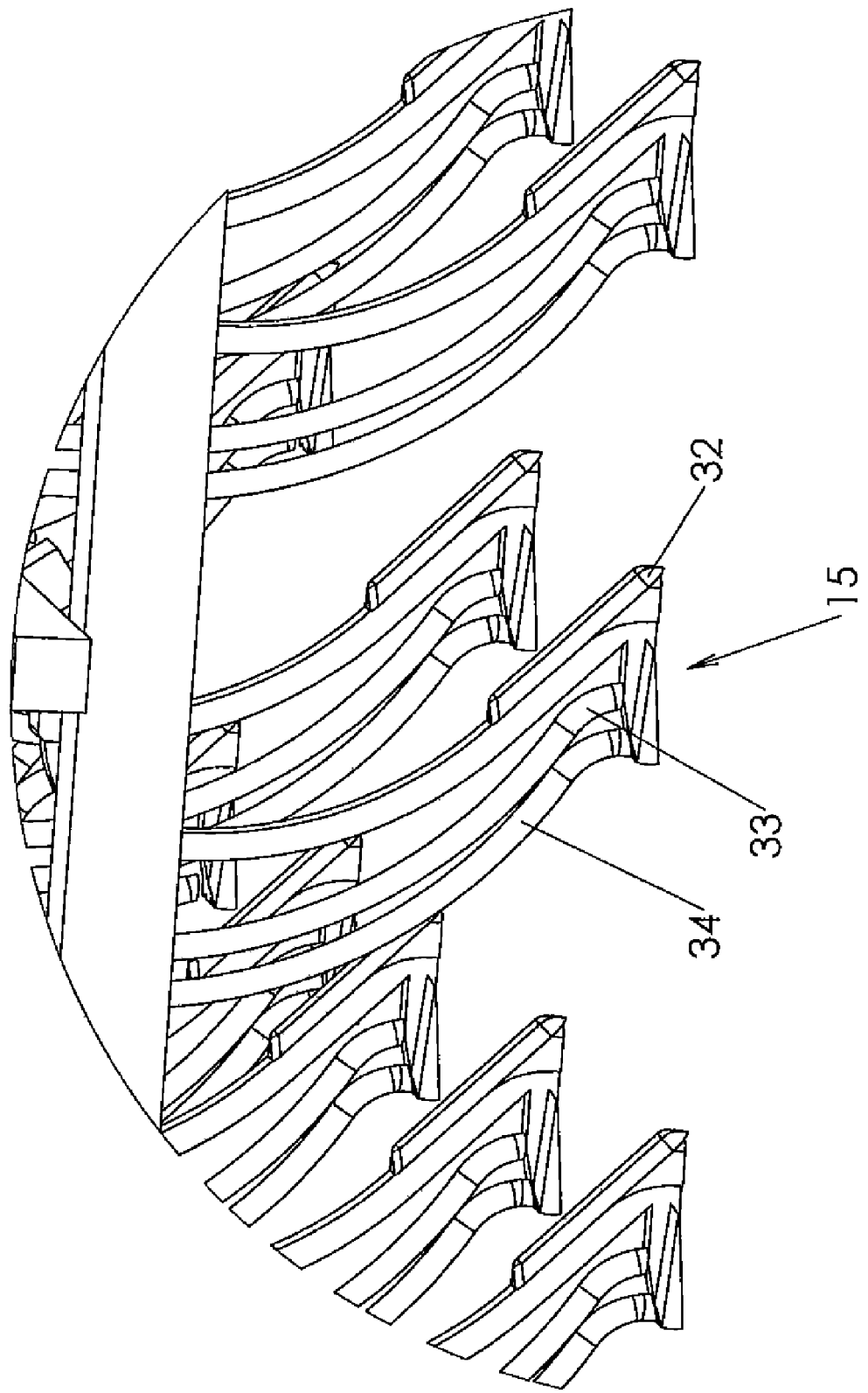
FIG. 15 is a detail view of the shanks that distribute the seed and exhaust gas into the ground.

FIG. 15 is a detail view of the shanks that distribute the seed and exhaust gas into the ground. As shown in this figure, each shank 15 is comprised of a tooth 32 for digging into the ground. Two distribution tubes—one for the exhaust gas and one for the seed—terminate in the shank 15, thereby allowing the exhaust gas and seed to be deposited into the ground at the same time. The exhaust gas is deposited via a tertiary distribution tube 33 in the middle of the shank 15, and the seed is deposited via the quaternary distribution tube 34 at the rear of the shank 15.

Figure 16:
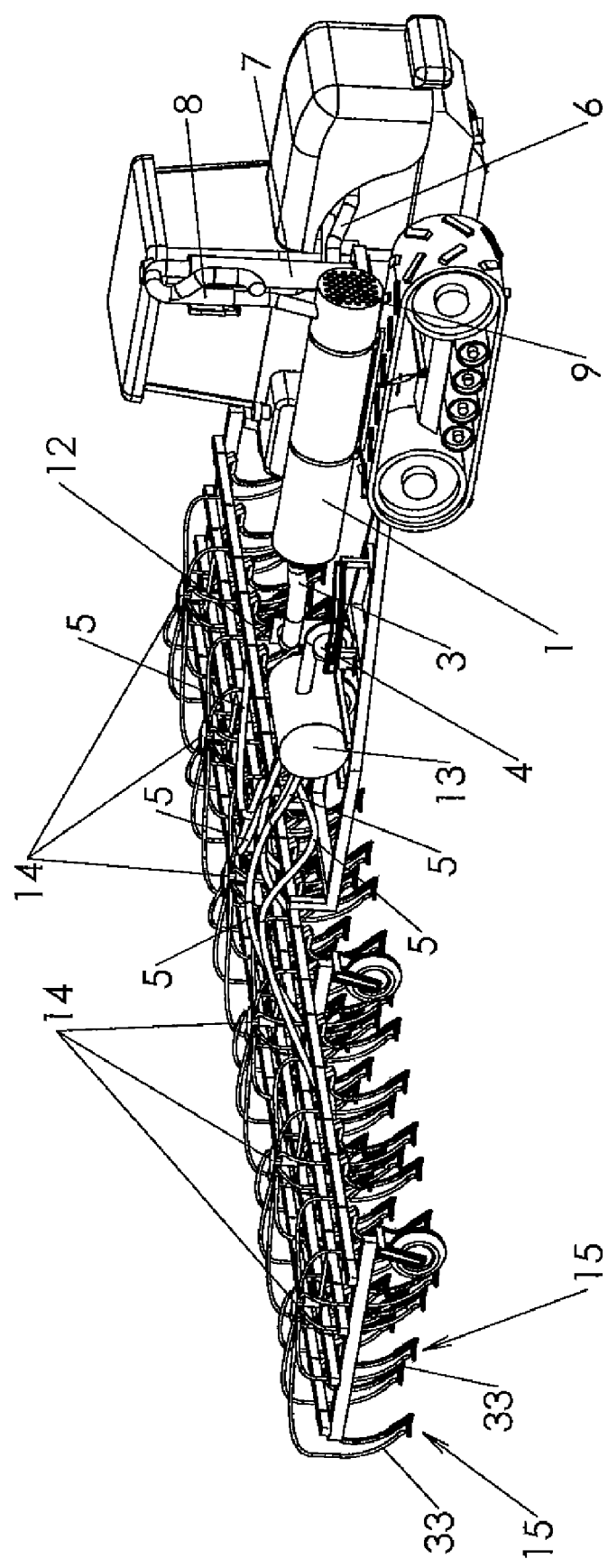
FIG. 16 is a perspective view of the present invention installed on a tractor with a cultivator attached to it.

FIG. 16 is a perspective view of the present invention installed on a tractor with a cultivator attached to it. This figure shows that the present invention may be utilized in connection with a cultivator rather than an air seeder. The installation of the cooling chamber 1 is the same. The primary distribution tube 3 is shorter in this embodiment because it does not need to travel around the air seeder cart. The distribution tank 13 looks different in this figure, but its purpose is the same as the distribution tank shown in FIG. 1. Because seed is not being deposited with the cultivator, there are only six manifolds (rather than the twelve shown in FIGS. 1 and 12). The secondary distribution tubes 5 distribute the exhaust gas to the various manifolds, and tertiary distribution tubes distribute it into the ground via the shanks 15.

Figure 17:
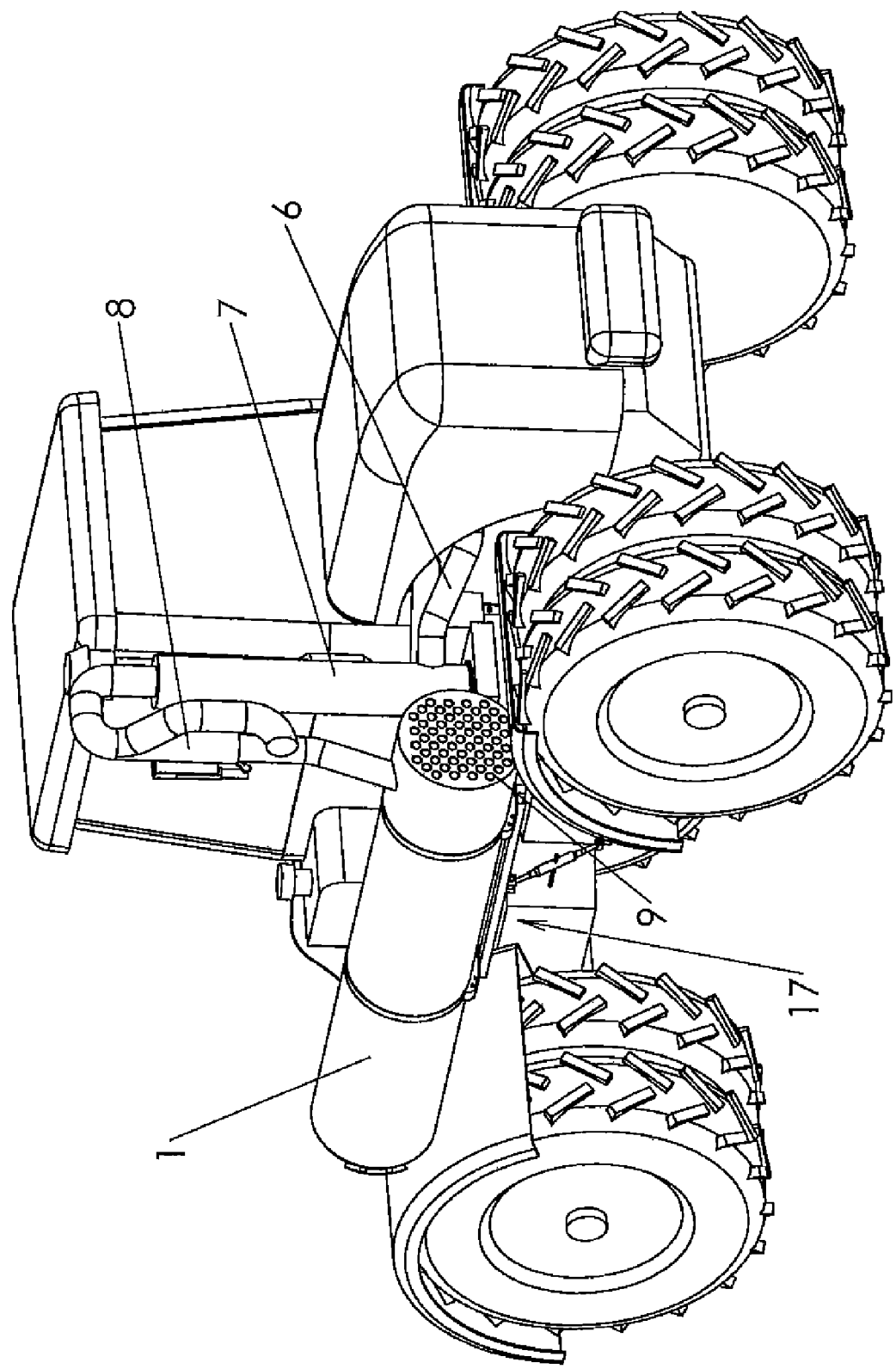
FIG. 17 is a perspective view of the present invention installed on a tractor with wheels.

FIG. 17 is a perspective view of the present invention installed on a tractor with wheels. The tractor shown in FIGS. 1-3, 14 and 16 is a track-type tractor (also called a "tractor crawler"), but the present invention may also be used with a tractor that runs on wheels instead of tracks. All aspects of the invention are the same as shown in previous figures.

Figure 18:
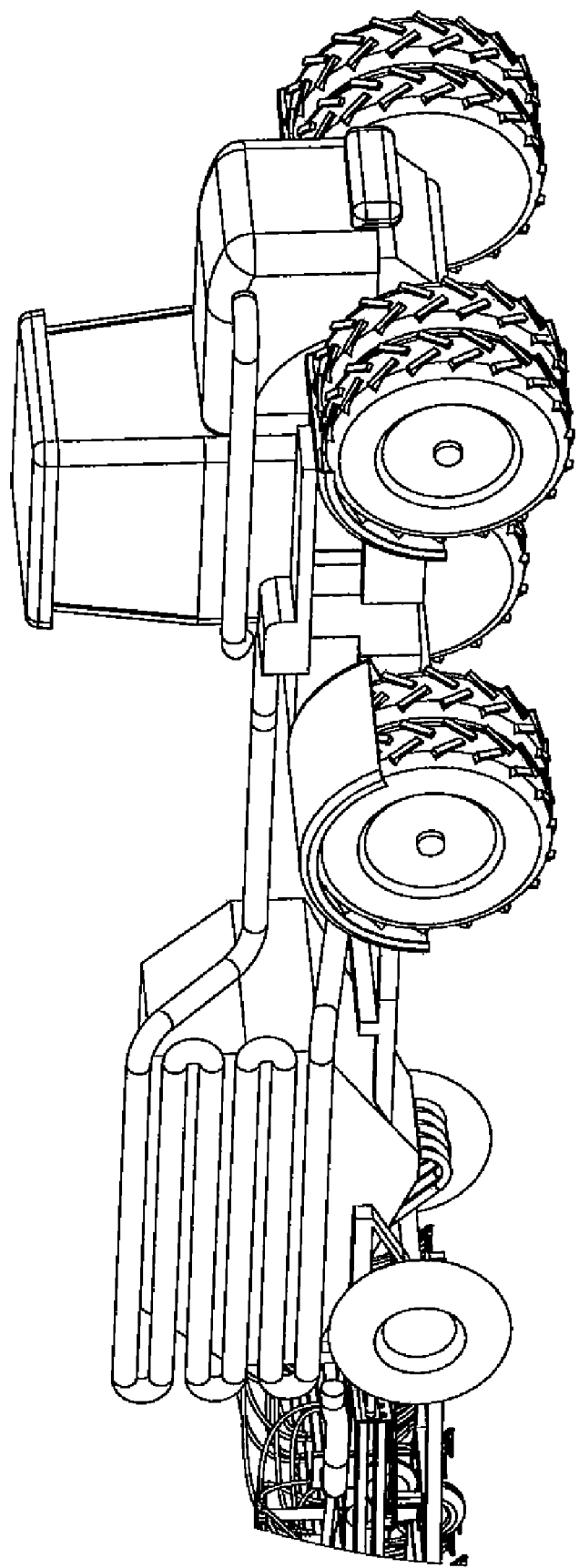
FIG. 18 is a perspective view of a prior art apparatus for cooling exhaust gas from an agricultural tractor prior to injection of the exhaust gas into the ground.

FIG. 18 is a perspective view of a prior art apparatus for cooling exhaust gas from an agricultural tractor prior to injection of the exhaust gas into the ground. This figure shows the apparatus described above in the Background section, namely, the apparatus that uses aluminum tubing to extend back and forth across the side of the air seeder cart and then into the air seeder fan. This apparatus is inferior to the present invention because it mixes the exhaust gas with the seed, and it does not allow for the degree of temperature and pressure control afforded by the present invention.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An exhaust gas cooling apparatus comprising:
   (a) a cooling chamber;
   (b) a primary distribution tube;
   (c) a cooling fan; and
   (d) a transfer fan;
   wherein the cooling chamber is mounted on the side of a tractor with an engine;
   wherein the cooling chamber has a front end and a rear end;
   wherein the cooling fan is installed in the rear end of the cooling chamber;
   wherein the cooling chamber comprises a plurality of longitudinal apertures through which ambient air travels;
   wherein the cooling chamber comprises a plurality of baffle chambers through which exhaust gas from the tractor engine travels;
   wherein the exhaust gas never mixes with the ambient air in the cooling chamber;
   wherein the cooling chamber comprises an exit port;
   wherein the exhaust gas travels through the exit port of the cooling chamber into a primary distribution tube;
   wherein the primary distribution tube carries the exhaust gas to a transfer fan;
   wherein the transfer fan blows the exhaust gas into a plurality of secondary distribution tubes;
   wherein the secondary distribution tubes transport the exhaust gas to a plurality of manifolds; and
   wherein the exhaust gas travels from the manifolds through a plurality of tertiary distribution tubes and into the ground.

2. The exhaust gas cooling apparatus of claim 1, wherein the tractor is attached to an air seeder comprising an air seeder cart;
   wherein the primary distribution tube carries the exhaust gas around the air seeder cart and to the transfer fan;
   wherein the transfer fan is located behind the air seeder cart;
   wherein the air seeder comprises a distribution system;
   wherein the air seeder distribution system is located behind the transfer fan;
   wherein the distribution system of the air seeder comprises a plurality of secondary distribution tubes, a first set of manifolds, a plurality of tertiary distribution tubes, and a plurality of quaternary distribution tubes;
   wherein the secondary distribution tubes of the air seeder are utilized to transport the exhaust gas from the transfer fan to the first set of manifolds;
   wherein the tertiary distribution tubes are utilized to transport the exhaust gas from the first set of manifolds to the ground;
   wherein the quaternary distribution tubes are used to deliver seed from a second set of manifolds to the ground;
   wherein the exhaust gas and the seed never come into contact with one another until they hit the ground; and
   wherein the exhaust gas never enters the air seeder cart.

3. The exhaust gas cooling apparatus of claim 1, wherein the tractor is attached to a cultivator;
   wherein the primary distribution tube carries the exhaust gas to a transfer fan located behind the tractor;
   wherein the cultivator comprises a distribution system;
   wherein the cultivator distribution system is located behind the transfer fan;
   wherein the distribution system of the cultivator comprises a plurality of secondary distribution tubes, a plurality of manifolds, and a plurality of tertiary distribution tubes;
   wherein the secondary distribution tubes of the cultivator are utilized to transport the exhaust gas from the transfer fan to the manifolds; and
   wherein the tertiary distribution tubes are utilized to transport the exhaust gas from the manifolds to the ground.

4. The exhaust gas cooling apparatus of claim 1, wherein the cooling chamber comprises:
   (a) a primary aluminum tube that forms an outer covering for the cooling chamber;
   (b) two circular aluminum end plates;
   (e) a plurality of secondary aluminum tubes that form the longitudinal apertures in the cooling chamber; and
   (d) two aluminum baffles that form three baffle chambers inside the cooling chamber;
   wherein a plurality of evenly spaced holes is cut into each of the end plates;
   wherein each hole in the end plate has an inside diameter and each secondary aluminum tube has an outside diameter, and the inside diameter of each hole in the end plate corresponds to the outside diameter of each secondary aluminum tube;
   wherein each secondary aluminum tube comprises a first end and a second end;
   wherein the first end of each secondary aluminum tube is inserted into a hole in one of the end plates, the second end of each secondary aluminum tube is inserted into a hole in the other end plate, and each secondary aluminum tube is welded to the end plates on either end of the secondary aluminum tube;
   wherein the length of each secondary aluminum tube is shorter than the length of the primary aluminum tube by the a first amount;
   wherein a first aluminum baffle is welded to one of the end plates and to a plurality of secondary aluminum tubes;
   wherein a second aluminum baffle is welded to the other end plate and to a plurality of secondary aluminum tubes;
   wherein each aluminum baffle is shorter than the length of the secondary aluminum tubes by a second amount;
   wherein the primary aluminum tube has an inside diameter, and the width of each aluminum baffle corresponds to the inside diameter of the primary aluminum tube where each baffle rests; and
   wherein the primary aluminum tube comprises a front end and a rear end, and wherein one of the end plates is welded to the front end of the primary aluminum tube, and the other end plate is welded inside of the primary aluminum tube at a distance from the rear end of the primary aluminum tube roughly equal to the first amount, thereby leaving space for the cooling fan to be installed.

5. The exhaust gas cooling apparatus of claim 1, further comprising a pyrometer sensor located in proximity to the exit port of the cooling chamber;
   wherein the ambient air traveling through the longitudinal apertures has a temperature and the exhaust gas entering the primary distribution tube has a temperature;

wherein the cooling fan controls the temperature of the ambient air traveling through the longitudinal apertures;

wherein the pyrometer sensor senses the temperature of the exhaust gas as it enters the primary distribution tube; and wherein the temperature of the exhaust gas entering the primary distribution tube can be controlled by increasing or decreasing the temperature of the ambient air via the cooling fan.

6. The exhaust gas cooling apparatus of claim 1, further comprising a pressure gauge located in proximity to the exit port of the cooling chamber;

wherein the exhaust gas entering the primary distribution tube has a pressure;

wherein the pressure gauge senses the pressure of the exhaust gas as it enters the primary distribution tube;

wherein the transfer fan has a speed; and wherein the pressure of the exhaust gas can be controlled by increasing or decreasing the speed of the transfer fan.

7. The exhaust gas cooling chamber of claim 1, wherein both the cooling fan and the transfer fan are controlled by variable speed hydraulic motors.

* * * * *